L. W. CHUBB & R. DE S. BROWN.
METHOD OF DETERMINING MELTING POINTS.
APPLICATION FILED MAY 6, 1915.
1,291,409.
Patented Jan. 14, 1919.
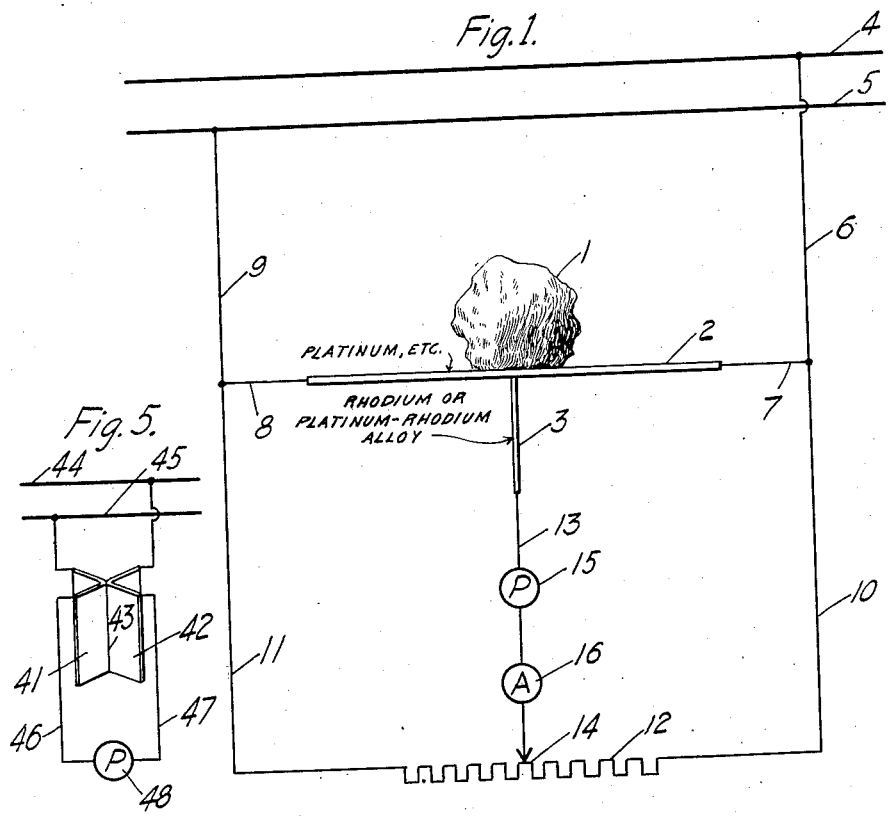
INVENTOR
Lewis W. Chubb &
Robson De S Brown.
BY
Wesley G. Carr
ATTORNEY

UNITED STATES PATENT OFFICE.

LEWIS W. CHUBB, OF EDGEWOOD PARK, AND ROBSON DE S. BROWN, OF WILKINSBURG, PENNSYLVANIA, ASSIGNORS TO WESTINGHOUSE ELECTRIC AND MANUFACTURING COMPANY, A CORPORATION OF PENNSYLVANIA.

METHOD OF DETERMINING MELTING-POINTS.

1,291,409.  Specification of Letters Patent.  Patented Jan. 14, 1919.

Application filed May 6, 1915. Serial No. 26,321.

*To all whom it may concern:*

Be it known that we, LEWIS W. CHUBB, a citizen of the United States, and a resident of Edgewood Park, in the county of Allegheny and State of Pennsylvania, and ROBSON DE S. BROWN, a citizen of the United States, and a resident of Wilkinsburg, in the county of Allegheny and State of Pennsylvania, have invented a new and useful Improvement in Methods of Determining Melting-Points, of which the following is a specification.

Our invention relates to methods and apparatus for determining melting points, and it has for one of its objects to provide a rapid and accurate method of determining the melting points of solid bodies without the necessity of visually observing the change of form of such bodies when they pass from the solid to the liquid state.

Another object of our invention is to provide convenient apparatus for practising the foregoing process.

In the accompanying drawing, Figure 1 is a diagrammatic view showing a system arranged for the determination of melting points according to our process. Fig. 2 is a diagrammatic view showing another arrangement of apparatus for carrying out the same process. Fig. 3 is a diagrammatic view showing a further modification of part of the apparatus employed. Fig. 4 is a vertical sectional view of a thermo-couple provided with a suitable holder, and Fig. 5 is a diagrammatic view showing a still further modification of suitable apparatus.

In a copending application for Letters Patent of. Lewis W. Chubb, Serial No. 26,322, filed May 6, 1915, a system for determining melting points is described, in which a particle of the material to be tested is placed upon a thermo-couple formed, for example, of a platinum support to which is electro-percussively welded, or otherwise intimately attached, a rhodium or platinum-rhodium wire. The platinum support is electrically heated by passing alternating current through it, and the melting point is determined by visually observing the particle through a suitable microscope, noting the instant when it changes its form and begins to fuse together, and, at that instant, observing the reading of a direct-current electrical measuring instrument inserted in circuit with the thermo-electro couple.

According to our present invention, we dispense with the visual observation of the material being tested and thereby increase the accuracy of the determination, since the observer may easily fail to observe the change of form of the test particle for an appreciable time, and the personal equation of the observer must be taken into account in making very accurate determinations. Our method consists, in general, in melting the material to be tested in contact with a thermo-electric couple, the terminals of which are connected to a direct-current measuring instrument, such as a potentiometer or a millivoltmeter and observing the readings of the instrument as, the temperature of the couple rises. At the instant when the material adjacent to the thermo-couple passes from the solid to the liquid state, the material will absorb its latent heat of fusion, and the temperature of the thermo-couple will remain nearly stationary for an appreciable time, or may even decrease, notwithstanding the constant increase in the heat applied to it. This pause in the rise of temperature will effect a corresponding pause in the rate of increase of the potential generated by the thermo-couple, which will cause a corresponding variation in the reading of the measuring instrument. The instrument will, therefore, by this pause in the movement of its indicator, show the exact potential generated by the thermo-couple at the instant when the material fuses, and the temperature may be computed from this reading by ordinary methods.

The point at which the instrument indicator pauses may be detected by merely observing the instrument and noting the point at which the steady advance of the indicator is temporarily interrupted. A more accurate method, however, is to take successive readings at equal intervals, a few seconds apart, and to plot a curve in which, for example, the ordinates represent time and the abscissas are fractions of millivolts. The curve will rise regularly, as the temperature rises, until the material reaches its melting point, when the curve will break sharply and then resume its original direction after the lapse of several observation periods.

The foregoing process may be practised by means of numerous different arrangements of circuits and apparatus, some of which are illustrated in the accompanying drawing. In Fig. 1, a test sample 1 is supported upon a flat support 2 of platinum or other refractory conducting material, to which is electro-percussively welded, or otherwise suitably attached, a rod or wire 3 which may be of rhodium or platinum-rhodium alloy. This arrangement of parts is similar to that shown in the copending application above referred to, and may be similarly connected to line conductors 4 and 5 energized from a suitable source of alternating current. Connection is made to the support 2 from the conductors 4 and 5 by means of supply conductors 6, 7, 8 and 9, and the conductors 7 and 8 are connected, by means of conductors 10 and 11, to a non-inductive resistance element 12. The member 3 of the thermo-electric couple is connected, by means of a conductor 13, to the neutral point 14 or point of no alternating current flow of the non-inductive resistance element 12, and, therefore, is not traversed by alternating current during the operation of the system. A direct-current measuring instrument 15, which preferably is a potentiometer, but which may be a millivoltmeter, is inserted in circuit in the conductor 13, and an alternating-current measuring instrument 16 may also be inserted in circuit in the conductor 13 for the purpose of bringing the terminal of the conductor 13 to the neutral point of the resistance element 12. In determining melting points by means of this system, the sample 1 is placed at the junction point of the members 2 and 3. Alternating current is supplied to the line conductors 4 and 5, and the instrument 15 is read at equal intervals in the manner described above.

Figs. 2, 3 and 5 show modified forms of thermo-couples. In the arrangement shown in Fig. 2, two wires 17 and 18, of different conducting materials, are crossed and welded together or otherwise united, forming a thermo-electric couple. The material to be tested is brought into contact with the junction point of the wires 17 and 18, which may be done by embedding this junction point in the material to be tested or pressing a portion of the material around the junction if it is a plastic substance. The terminals 19 and 20 of the wires 17 and 18 are respectively connected to line conductors 21 and 22 that are energized from a suitable source of alternating current, while the opposite terminals 23 and 24 of the wires 17 and 18 are connected, by means of conductors 25 and 26, to a direct-current measuring instrument 27, either a potentiometer or a millivoltmeter. Determinations are made with this device in the manner described above.

Fig. 3 shows a modified device, in which the thermo-couple is a small flat sheet or ribbon 28 formed by percussively welding the ends of two rods of different materials together, rolling out the welded rods into a thin sheet and cutting out a small portion including parts of both materials. The notched outline, as shown, is advantageous because it localizes the heat at the junction point between the two unlike metals. Alternating current for heating the couple is supplied from line conductors 29 and 30, through supply conductors 31 and 32 which are attached to opposite points of the thermo-couple 28. The opposite members 33 and 34 of the thermo-couple consist, as stated, of different conducting materials, and are connected, by conductors 35 and 36, to a direct-current measuring instrument 37 by means of which determinations are made, as already described. This form of thermo-couple is particularly convenient when mounted in a holder, such as that shown in Fig. 4, in which the thermo-couple 28 is backed with felt or other suitable heat-insulating material 38 and is attached to a suitable handle 39. The necessary electrical connections are provided and led from the handle in a cord 40. By means of this device, the thermo-couple may be placed flat against the side of a mass of any material, the melting point of which is to be determined, and the melting point ascertained very quickly and with great precision by means of the direct-current measuring instrument.

Another form of thermo-couple that is illustrated in Fig. 5, consists of two ribbons or plates 41 and 42 of unlike conducting materials, spot-welded together along the line 43 and bent into the form shown. The electrical connections are similar to those shown in Fig. 2, alternating current for heating the couple being supplied from line conductors 44 and 45 to two unlike leaves of the thermo-couple, while the two remaining leaves are connected, by means of conductors 46 and 47, to a measuring instrument 48. This form of thermo-couple is particularly useful in determining the melting points of soft materials into which the couple may be thrust edgewise, a suitable handle (not shown) being provided for this purpose.

The foregoing apparatus has been shown and described by way of illustrating the numerous ways in which our invention may be practised, and it is to be understood that our invention comprehends all such modifications and adaptations as fall within the scope of the appended claims.

We claim as our invention:

1. The method of determining melting points that consists in placing the material to be tested in engagement with a thermo-couple, heating the couple by regularly increasing increments and observing the value of the potential generated by the couple at the point at which the progressive increase in the generated potential is interrupted by reason of the absorption of heat at the melting point by the material being tested.

2. The method of determining melting points that comprises placing the material to be tested in contact with a thermo-electric couple, heating the said couple, by regular and progressive increments, and reading upon a direct current measuring instrument associated with the said couple the point at which the progressive increase in the potential generated by the said couple is interrupted by reason of the absorption of heat at the melting point by the material being tested.

3. The method of determining melting points that comprises placing the material to be tested in contact with a thermo-electric couple, passing alternating electric current through the said couple to raise its temperature, by regular and progressive increments, to the melting point of the said material, and periodically observing a direct current measuring instrument, so associated with the said couple as to measure the potential generated thereby, as the temperature of the said couple is raised.

4. A device for determining melting points that comprises a thermo-electric couple consisting of two crossed and united bodies of different conducting materials, means for supplying electric current to two unlike arms of the said couple, and an electrical measuring instrument connected in circuit with the other two arms of the said couple.

5. A device for determining melting points that comprises a thermo-electric couple consisting of two crossed and united bodies of different conducting materials, means for supplying alternating electric current to two unlike arms of the said couple, and a direct-current measuring instrument connected in circuit with the other two arms of the said couple.

6. A device for determining melting points that comprises a thin plate composed of two intimately united portions of different conducting materials, constituting a thermo-electric couple, and modified in outline to localize the applied heat at the junction point of the two materials, means for supplying electric current to the said plate, an electrical measuring instrument and means whereby the same is connected to measure the potential generated by the said couple.

7. A device for determining melting points that comprises a thin plate composed of two portions of different conducting materials butt-welded together and constituting a thermo-electric couple, the said couple being notched to localize the applied heat at the junction point of the two materials, means for supplying electric current to the said plate, an electric measuring instrument, means whereby the same is connected to measure the energy generated by the said couple, and a holder for the said plate.

In testimony whereof we have hereunto subscribed our names this 30th day of April, 1915.

LEWIS W. CHUBB.
ROBSON De S. BROWN.